United States Patent
Chen et al.

(10) Patent No.: US 9,777,793 B1
(45) Date of Patent: Oct. 3, 2017

(54) SIX-DEGREE-OF-FREEDOM MICRO VIBRATION SUPPRESSION PLATFORM AND CONTROL METHOD THEREOF

(71) Applicant: HUAZHONG UNIVERSITY OF SCIENCE AND TECHNOLOGY, Wuhan, Hubei (CN)

(72) Inventors: Xuedong Chen, Hubei (CN); Min Wang, Hubei (CN); Yixiu Sun, Hubei (CN); Xiaoqing Li, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/349,670

(22) Filed: Nov. 11, 2016

(30) Foreign Application Priority Data

Sep. 20, 2016 (CN) .......................... 2016 1 0834355

(51) Int. Cl.
| | |
|---|---|
| *G05B 19/402* | (2006.01) |
| *F16F 15/00* | (2006.01) |
| *F16M 11/22* | (2006.01) |
| *F16F 15/06* | (2006.01) |
| *H02N 2/00* | (2006.01) |

(52) U.S. Cl.
CPC .......... *F16F 15/002* (2013.01); *F16F 15/06* (2013.01); *F16M 11/22* (2013.01); *G05B 19/402* (2013.01); *H02N 2/001* (2013.01); *G05B 2219/37351* (2013.01); *G05B 2219/39241* (2013.01)

(58) Field of Classification Search
CPC ................................ F16F 15/00; F16F 15/007
USPC ......................................................... 700/280
See application file for complete search history.

(56) References Cited

U.S. PATENT DOCUMENTS

| | | | |
|---|---|---|---|
| 2010/0038995 A1* | 2/2010 | Claeyssen .............. | H02N 2/025 310/323.02 |
| 2016/0140862 A1* | 5/2016 | Van Lookeren Campagne ............... | G09B 9/12 434/55 |

FOREIGN PATENT DOCUMENTS

| | | | | |
|---|---|---|---|---|
| WO | WO2015018236 | * | 2/2015 | .............. F16F 15/04 |

OTHER PUBLICATIONS

Chen Xuedong, WO2015018236 Translation, Feb. 2015.*

* cited by examiner

*Primary Examiner* — Alan Chu
(74) *Attorney, Agent, or Firm* — Hamre, Schumann, Mueller & Larson, P.C.

(57) ABSTRACT

A six-degree-of-freedom micro vibration suppression platform includes a basic platform, a load platform, six sets of single-degree-of-freedom active and passive composite vibration isolation devices that are exactly the same and a controller. Upper and lower ends of each set of single-degree-of-freedom active and passive composite vibration isolation devices are connected with the load platform and the basic platform, respectively. A control method includes: calculating a logical axis signal, calculating a logical axis control signal, calculating physical axis real-time control signals and a transfer step.

5 Claims, 10 Drawing Sheets

SIX-DEGREE-OF-FREEDOM MICRO VIBRATION SUPPRESSION PLATFORM AND CONTROL METHOD THEREOF

TECHNICAL FIELD

The present invention belongs to the field of micro vibration isolation and suppression, and in particular, relates to a six-degree-of-freedom micro vibration suppression platform and a control method thereof.

BACKGROUND ART

Micro vibrations are present in some complicated working environments, and the micro vibrations are key factors that affect machining or working precision of devices. The traditional passive vibration isolator consists of mass-spring-damping elements, but it cannot meet the vibration isolation requirement of precise machining as it has inherent contradictions between the low-frequency vibration transmissibility and the high-frequency vibration attenuation rate. Relative to a passive vibration isolation mechanism, active vibration isolation has greatly improved the performance of the system, but it requires a sensor-actuator pair and a corresponding active control system, which requires the active vibration isolation mechanism to have a simple structure, an efficient algorithm and lower power consumption.

In terms of the structure, the current mainstream micro vibration isolation or suppression devices are formed by connecting passive vibration isolation elements and active actuators in a certain manner. For example, means such as the active and passive composite use of an air spring and a voice coil motor, the active and passive composite use of a diaphragm spring and a voice coil motor, the active and passive composite use of a metal spring and a linear motor, effectively suppress the micro vibrations and have better low frequency and high frequency attenuation capability, but they all have the following problems:

1. Although the active and passive parallel mechanism of the air spring and the voice coil spring causes the vibration isolator to have the advantages of large stroke, high load, low natural frequency and so on, it has a complicated structure and needs to supply air continuously, and the voice coil motor has great power consumption, all of which are not conductive to applications in the space and thus restrict its application to the micro vibration suppression.

2. The active and passive parallel mechanism of the metal spring and the linear motor intends to obtain a lower natural frequency by using a compression spring, which has a higher requirement for the mounting precision and is also relatively difficult in enhancing the control precision.

3. An active vibration isolator designed and applied by employing piezoelectric ceramics as an actuating mechanism has the advantages of high frequency response, high positioning precision and long service life, but it also has the disadvantage of a smaller actuation stroke. Therefore, in practical use, it is often necessary to broaden its effective stroke in combination with technical means, leading to the increase in the cost and inconvenient use.

4. For the field of micro vibration suppression and isolation, wide frequency band and high frequency response are its main characteristics, and the piezoelectric actuator stands out. However, as the active vibration isolation mechanism that employs piezoelectric ceramics as an actuator has greater structural stiffness, it is mostly referred to as a "hard" structure. As a result, the natural frequency of the system is too high, and it is difficult to effectively suppress low-frequency vibrations.

The Patent Document CN102168738B recorded in the State Intellectual Property Patent Office of China discloses a six-degree-of-freedom active and passive dynamic vibration absorbing device, which consists of six motor-actuated single-degree-of-freedom dynamic vibration absorbers, has active and passive control modes and can adapt to multi-degree-of-freedom complicated vibration suppression working conditions, but has special mounting requirements for occasions of use. Moreover, the motion of each degree of freedom requires two vibration absorbers to act at the same time, the requirement for synchronous control precision is higher, and the manufacturing difficulty and the use restriction are greater.

SUMMARY

The present invention provides a six-degree-of-freedom micro vibration suppression platform and also provides a control method thereof, to solve the problems in the prior art that the active and passive composite vibration isolation mechanism is of a complicated structure and is controlled in a complicated way.

In order to achieve the above objective, the present invention provides a six-degree-of-freedom micro vibration suppression platform, including: a basic platform, a load platform, six sets of single-degree-of-freedom active and passive composite vibration isolation devices that are exactly the same and a controller;

axes of the six sets of single-degree-of-freedom active and passive composite vibration isolation devices forming six sides remaining after the sides connected by two diagonal vertices of a cube are removed, intersection points of the axes being six vertices of the cube, three upper intersection points being fixed onto the load platform and being evenly distributed on the load platform along the circumference at an interval of 120°; three lower intersection points being fixed onto the basic platform and being evenly distributed on the basic platform along the circumference at an interval of 120°; axes of any two adjacent single-degree-of-freedom active and passive composite vibration isolation devices being perpendicular to each other, and the same end being disposed towards the intersection point of the axes;

the single-degree-of-freedom active and passive composite vibration isolation devices each including an upper flexible hinge, an active vibration isolation assembly, a passive vibration isolation assembly and a lower flexible hinge that are sequentially connected and fixed; and the controller being connected with the active vibration isolation assemblies of the six sets of single-degree-of-freedom active and passive composite vibration isolation devices, for obtaining a real-time control signal by calculation and outputting the real-time control signal to the active vibration isolation assemblies, to make active control compensations for vibrations.

Further, the active vibration isolation assembly includes a piezoelectric actuator, a mechanical amplification member, a dynamic force sensor, a bellow shielding tube and a baffle plate; and the passive vibration isolation assembly includes a metal spring, an upper guide plate, a lower guide plate, a sleeve and a screw;

wherein the piezoelectric actuator, the mechanical amplification member and the dynamic force sensor are disposed in the interior of the bellow shielding tube, and at a lower end of the bellow shielding tube is the baffle plate; the dynamic force sensor is fixed to an upper end of the bellow shielding tube, an upper end of the mechanical amplification member is fixed to a lower end of the dynamic force sensor, and a lower end of the mechanical amplification member is stopped at an inner side of the baffle plate and is fixed to an upper end of the screw; the piezoelectric actuator is fixed to the interior of the mechanical amplification member, and the mechanical amplification member is used for amplifying the motion stroke of the piezoelectric actuator; the bellow shielding tube is axially telescopic; and the upper flexible hinge is mounted to the upper end of the bellow shielding tube;

the upper end of the screw is an upper guide bolt, and the lower end thereof is a lower guide bolt; the upper guide bolt passes through the baffle plate to enter the interior of the bellow shielding tube, and is connected and fixed to the lower end of the mechanical amplification member; the upper guide plate is stopped at a lower side of the baffle plate, and is fixed by the upper guide bolt; an end portion of the lower guide bolt is fixed to an upper end of the lower flexible hinge, and the lower guide plate is stopped at the upper end of the lower flexible hinge and is fixed by the lower guide bolt; the metal spring is sleeved on the screw and is stopped between the upper guide plate and the lower guide plate, and the sleeve is sleeved between the screw and the metal spring; and the piezoelectric actuator and the dynamic force sensor are connected with the controller, respectively, and the dynamic force sensor is used for detecting a vibration signal of the load platform and inputting the vibration signal to the controller; the controller is used for calculating a real-time control signal according to the obtained vibration signal and outputting the real-time control signal to the piezoelectric actuator, to deform the piezoelectric actuator; the mechanical amplification member is used for mechanically amplifying the stroke of the piezoelectric actuator, and acting on the load platform by transfer of the bellow shielding tube and the upper flexible hinge, to make active control compensations for residual error vibrations of the load platform.

Further, the lower flexible hinge and the upper flexible hinge are of the same structure and both employ a flexible Hooke joint.

Further, the piezoelectric actuator is a stack-type or tube-type piezoelectric ceramic actuator; the mechanical amplification member is a triangular amplification member or a micro motion worktable amplification member.

Further, the method includes the following steps:

A. calculating a logical axis displacement signal x of the centroid point of the load platform the six active vibration isolation assemblies measuring vibration force signals in axial directions of the six sets of single-degree-of-freedom active and passive composite vibration isolation devices respectively and delivering up the vibration force signals to the controller, the controller converting the vibration force signals to displacement signals $q_1$, $q_2$, $q_3$, $q_4$, $q_5$, $q_6$, by two integrations and a detrend item, to form a physical axis displacement signal $q=[q_1\ q_2\ q_3\ q_4\ q_5\ q_6]^T$ which is converted, by an operation $\dot{q}=J\cdot\dot{x}$ to the logical axis displacement signal of the centroid point of the load platform as follows:

$$x=[x y z \alpha \beta \gamma]^T$$

wherein J is the velocity Jacobian matrix, and x, y, z, $\alpha$, $\beta$, $\gamma$ are translational displacement signals and rotation angle signals of the centroid point of the load platform along X, Y and Z axes, respectively;

$$J = \begin{bmatrix} l_1^T & l_1^T \tilde{p}_1 \\ l_2^T & l_2^T \tilde{p}_2 \\ l_3^T & l_3^T \tilde{p}_3 \\ l_4^T & l_4^T \tilde{p}_4 \\ l_5^T & l_5^T \tilde{p}_5 \\ l_6^T & l_6^T \tilde{p}_6 \end{bmatrix}$$

wherein $l_1$, $l_2$, $l_3$, $l_4$, $l_5$, $l_6$ are unit direction vectors of the six sets of single-degree-of-freedom active and passive composite vibration isolation devices, respectively, $p_1$, $p_2$, $p_3$, $p_4$, $p_5$, $p_6$ are platform radius vectors formed by hinge connecting points of the upper flexible hinges of the six sets of single-degree-of-freedom to active and passive composite vibration isolation devices and the centroid point of the load platform, respectively, $p=[p_1\ p_2\ p_3\ p_4\ p_5\ p_6]$ is a radius matrix formed by the platform radius vectors, and $\tilde{p}=[\tilde{p}_1\ \tilde{p}_2\ \tilde{p}_3\ \tilde{p}_4\ \tilde{p}_5\ \tilde{p}_6]$ is an anti-symmetric matrix of $p=[p_1\ p_2\ p_3\ p_4\ p_5\ p_6]$;

B. calculating a logical axis control signal x' of the centroid point of the load platform obtaining a logical axis control signal by $x'=[x'\ y'\ z'\ \alpha'\ \beta'\ \gamma']^T$ calculation with an active control algorithm according to the logical axis displacement signal x, wherein x', y', z', $\alpha'$, $\beta'$, $\gamma'$ are translational displacement signals and rotation angle signals of the centroid point, after a calculation process, along X, Y and Z axes, respectively;

C. calculating physical axis real-time control signals of the six sets of single-degree-of-freedom active and passive composite vibration isolation devices:

by transposing the velocity Jacobian matrix $J^T$ converting the logical axis control signal x' to a physical axis control signal $q'=[q'_1\ q'_2\ q'_3\ q'_4\ q'_5\ q'_6]^T$, $\dot{q}=J^T\cdot\dot{x}'$, wherein $q'_1$, $q'_2$, $q'_3$, $q'_4$, $q'_5$, $q'_6$ are respectively control signals of the six sets of single-degree-of-freedom active and passive composite vibration isolation devices after the conversion; wherein the expression of transposing the Jacobian matrix $J^T$ is as follows:

$$J^T = \begin{bmatrix} l_1^T & l_2^T & l_3^T & l_4^T & l_5^T & l_6^T \\ l_1^T \tilde{p}_1 & l_2^T \tilde{p}_2 & l_3^T \tilde{p}_3 & l_4^T \tilde{p}_4 & l_5^T \tilde{p}_5 & l_6^T \tilde{p}_6 \end{bmatrix}$$

D. a transfer step:

the controller transferring the physical axis real-time control signals of the six sets of single-degree-of-freedom active and passive composite vibration isolation devices to the corresponding active vibration isolation assemblies, respectively, to make real-time active vibration compensations for the corresponding single-degree-of-freedom active and passive composite vibration isolation devices.

Further, the active vibration isolation assemblies each include a piezoelectric actuator, a mechanical amplification member and a dynamic force sensor, and in step A, the six dynamic force sensors measure vibration force signals in axial directions of the six sets of single-degree-of-freedom active and passive composite vibration isolation devices, respectively; in step D, the controller transfer the physical axis real-time control signals of the six sets of single-degreeof-freedom active and passive composite vibration isolation devices to the corresponding piezoelectric actuators, respectively; the mechanical amplification members amplify the motion strokes of the piezoelectric actuators to make vibration compensations, thereby achieving active vibration compensations.

The present invention has a simple structure, is adjustable in stiffness, and may reduce dynamic stiffness of the system by using series connection of system stiffness, thus reducing the natural frequency of the system. The present invention can change the system stiffness and damping characteristics by using the active vibration isolation unit, thus changing the property of transmissibility of the system, and can suppress and isolate six-degree-of-freedom micro vibrations in translational directions and rotational directions of X, Y and Z axes, which not only better attenuates high-frequency signals but also, in the control method, can increase the skyhook damping of formant frequency points and can effectively suppress low-frequency resonance and isolate low-frequency vibrations. The present invention can adapt to different occasions, and can effectively attenuate micro vibrations at different frequency bands, to provide reliable guarantee for precise machining and measurement devices in micro vibration environments.

BRIEF DESCRIPTION OF THE DRAWINGS

In all the drawings, the same reference signs are used to represent the same elements or structures, wherein.

Figure 1:
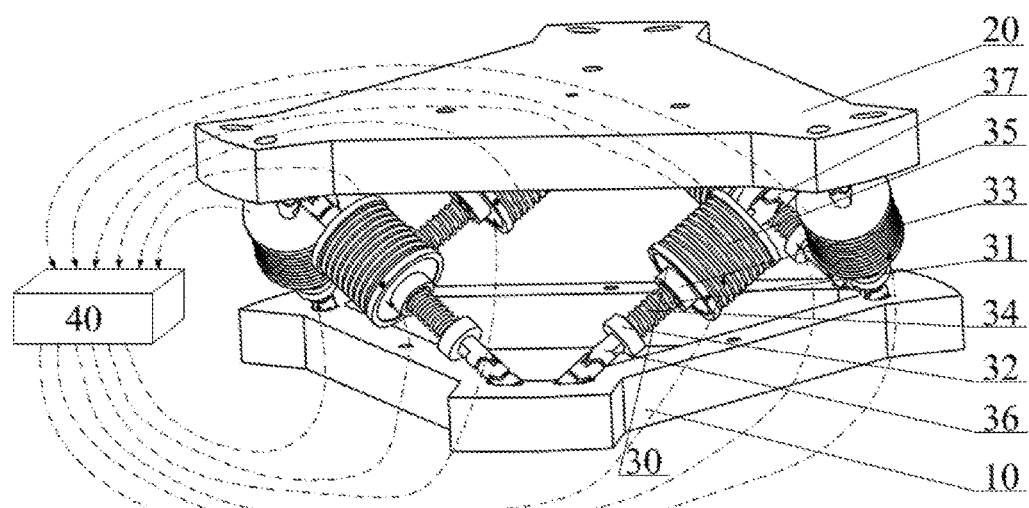
FIG. 1 is a schematic three-dimensional structural diagram of the present invention.
Figure 2:
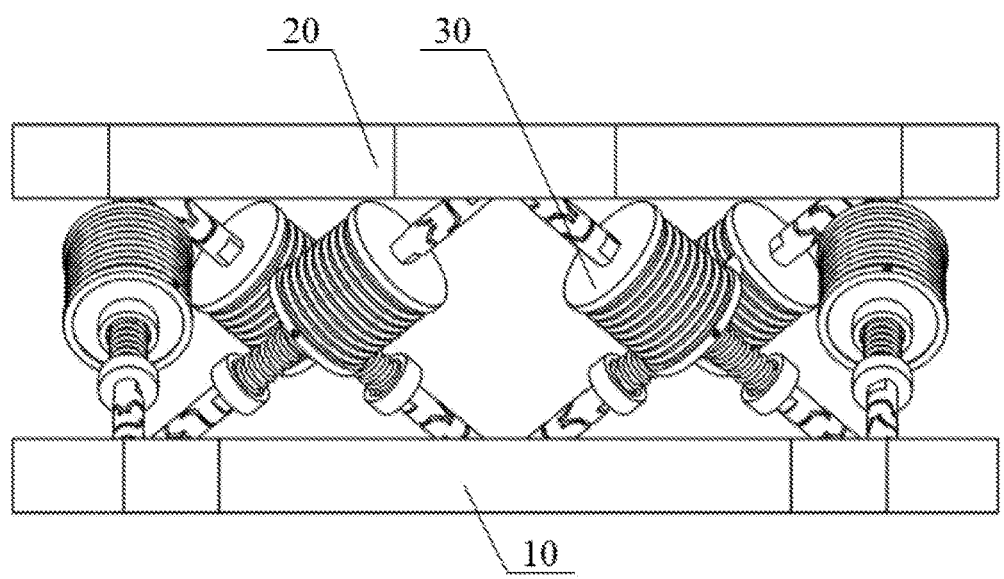
FIG. 2 is a front view of the present invention.
Figure 3:
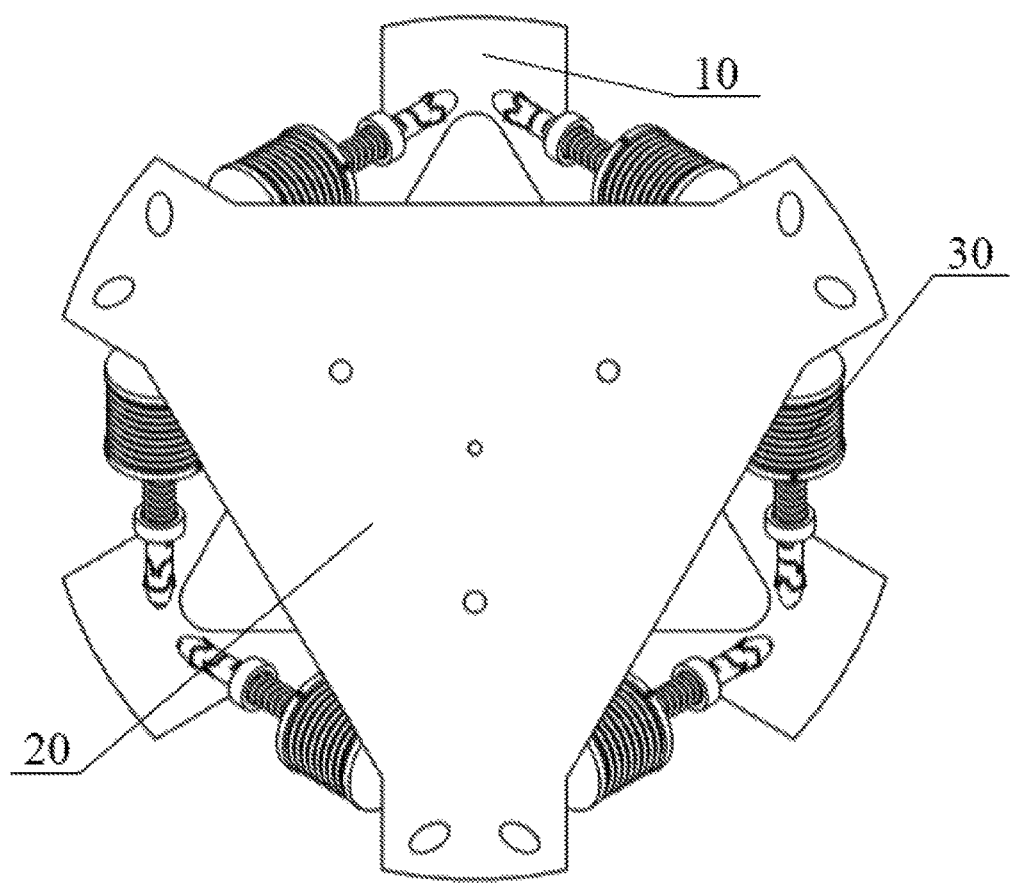
FIG. 3 is a top view of the present invention.
Figure 4:
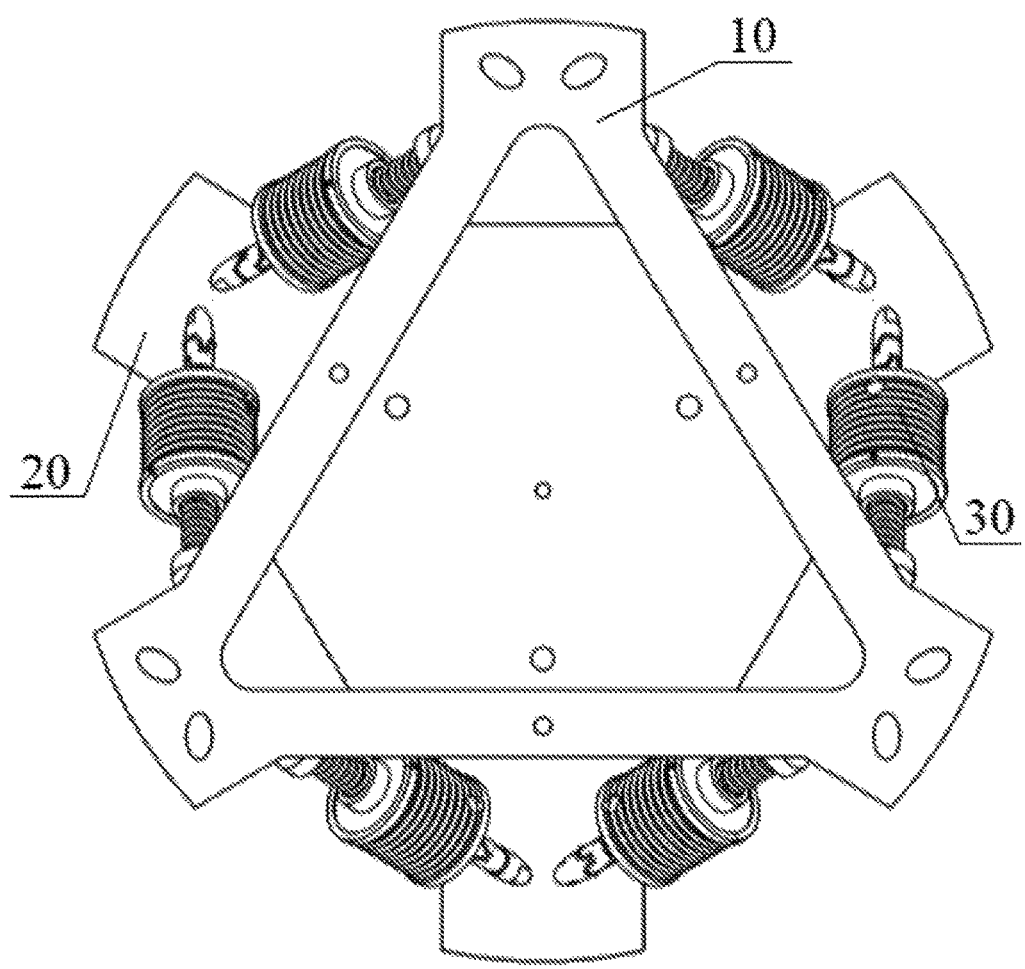
FIG. 4 is a bottom view of the present invention.

| basic platform 10 | load platform 20 | controller 40 |
|---|---|---|
| single-degree-of-freedom active and passive composite vibration isolation device 30 | | |
| metal spring 31 | lower guide plate 32 | lower guide bolt 321 |
| upper guide plate 33 | upper guide bolt 331 | sleeve 34 |
| piezoelectric actuator 351 | mechanical amplification member 352 | dynamic force sensor 353 |
| bellow shielding tube 354 | baffle plate 355 | lower flexible hinge 36 |
| upper flexible hinge 37 | | |

DETAILED DESCRIPTION

In order to make the objectives, technical solutions and advantages of the present invention more comprehensible, the present invention is further described below in detail with reference to the accompanying drawings and embodiments. It should be understood that specific embodiments described herein are merely used to explain the present invention instead of being used to limiting the present invention. In addition, technical features involved in various implementation modes of the present invention described in the following can be combined with each other as long as they do not conflict with each other.

To understand the present invention more clearly, the concepts and terms involved in the present invention are explained in the following:

In the present invention, a Cartesian space rectangular coordinate system is employed as the coordinate system of the load platform, the centroid of the load platform is the origin O, the load platform is located in an XOY plane, the X axis and the Z axis are coplanar in the principal plane, the horizontal leftward direction of the X axis is the positive direction, the vertical upward direction of the Z axis is the positive direction, and the outward direction of the Y axis perpendicular to the principal plane is the positive direction.

A unit direction vector of a single-degree-of-freedom active and passive composite vibration isolation device refers to a ratio of a vector from a connecting point B between the lower flexible hinge in the single-degree-of-freedom active and passive composite vibration isolation device and the basic platform to a connecting point A between the upper flexible hinge and the load platform to the modulus of the vector, which may be expressed as:

$$l_i = \frac{\overrightarrow{BA}}{|\overrightarrow{BA}|}, (i = 1, 2, 3, 4, 5, 6);$$

A platform radius vector is a vector formed by hinge connecting points of the centroid point of the load platform to the upper flexible hinge of the single-degree-of-freedom active and passive composite vibration isolation device and the load platform.

The present invention is further described below with reference to the accompanying drawing and embodiments.

As shown in FIG. 1 to FIG. 4, the present invention includes a basic platform 10, a load platform 20, six sets of single-degree-of-freedom active and passive composite vibration isolation devices 30 that are exactly the same and a controller 40. Upper and lower ends of each set of single-degree-of-freedom active and passive composite vibration isolation devices are connected with the load platform 20 and the basic platform 10 by sunk screws, respectively.

Figure 10:
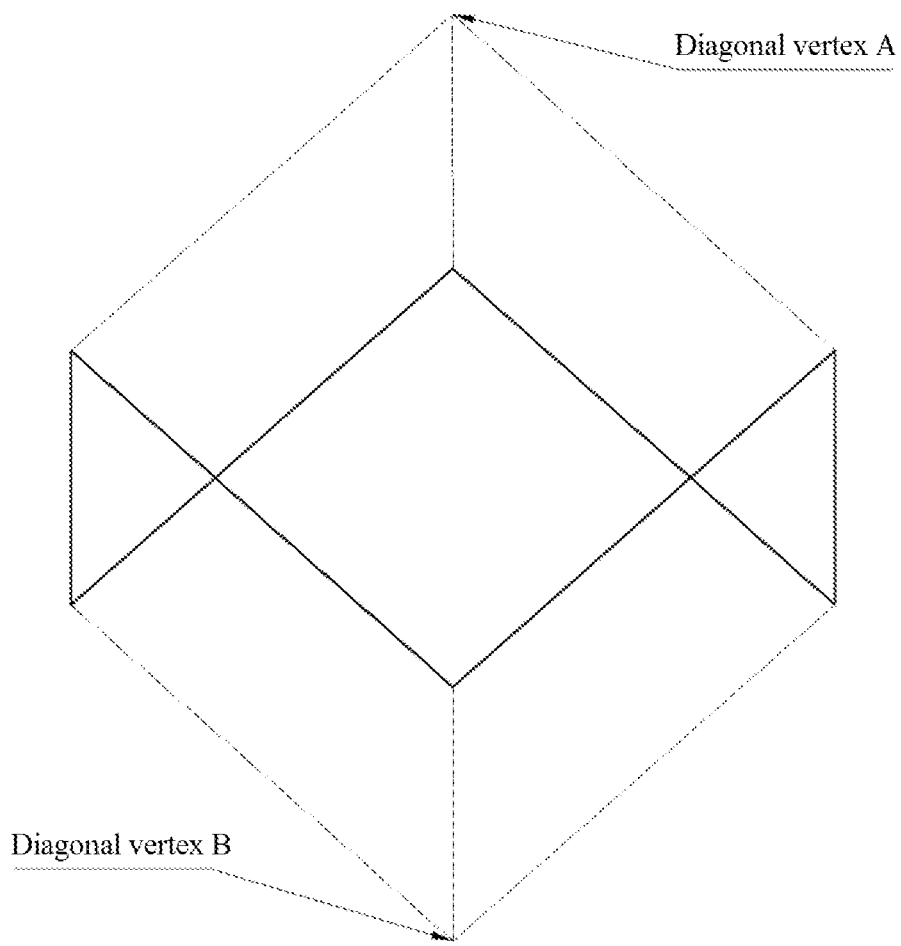
FIG. 10 is a schematic diagram of positional relations between axes of the six sets of single-degree-of-freedom active and passive composite vibration isolation devices in FIG. 1.

Positional relations between axes of the six sets of single-degree-of-freedom active and passive composite vibration isolation devices form six sides of a cube, and intersection points of the axes are six vertices of the cube. Specifically, as shown in FIG. 10, the positional relations between axes of the six sets of single-degree-of-freedom active and passive composite vibration isolation devices are as the solid lines in the figure, and there are a total of six solid lines. Suppose that there is a cube in the space, the cube has twelve sides in total, diagonal vertices A and B are two endpoints of one diagonal line of the cube, and after three sides connected by the two diagonal vertices A and B respectively are removed, that is, six dashed lines in the figure are removed, the remaining six solid lines are spatial arrangements of six axes of the six sets of single-degree-of-freedom active and passive composite vibration isolation devices. Referring to FIG. 1 and FIG. 10, three upper intersection points determine the plane of the load platform 20 and are evenly distributed on the load platform 20 along the circumference at an interval of 120°; three lower intersection points determine the basic platform 10 and are evenly distributed on the basic platform 10 along the circumference at an interval of 120°; and two adjacent axes are perpendicular to each other.

Figure 5:
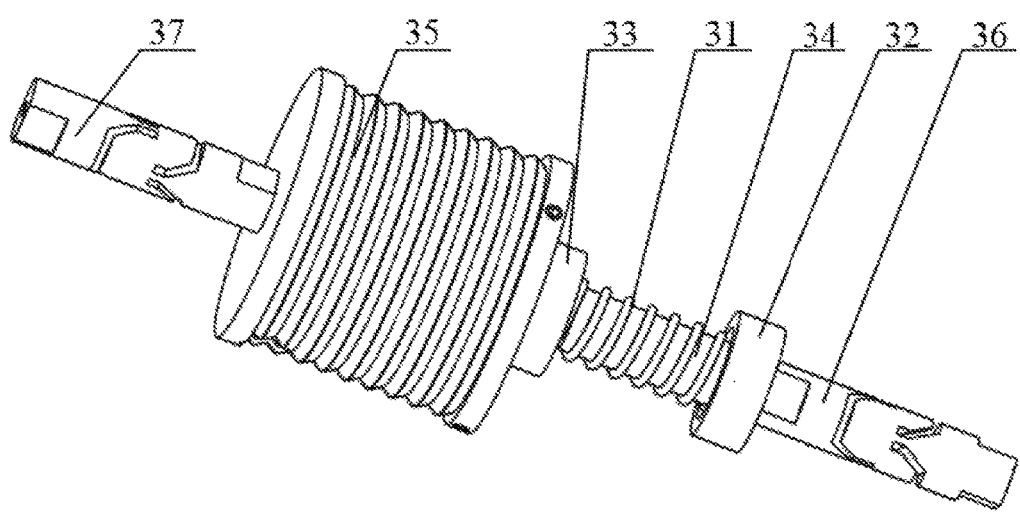
FIG. 5 is a schematic structural diagram of a single-degree-of-freedom active and passive composite vibration isolation device.
Figure 6:
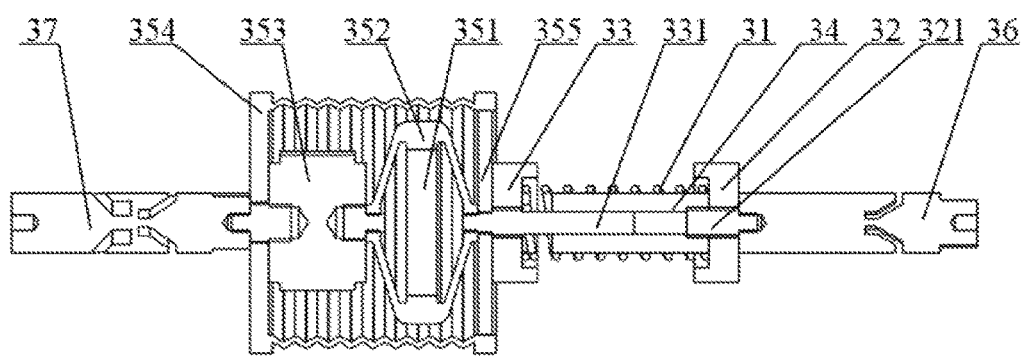
FIG. 6 is a sectional view of a single-degree-of-freedom active and passive composite vibration isolation device.

As shown in FIG. 5 and FIG. 6, each set of single-degree-of-freedom active and passive composite vibration isolation device 30 consists of a metal spring 31, a lower guide plate 32, an upper guide plate 33, a sleeve 34, a piezoelectric actuator 351, a mechanical amplification member 352, a dynamic force sensor 353, a bellow shielding tube 354, a baffle plate 355, a lower flexible hinge 36 and an upper flexible hinge 37.

The piezoelectric actuator 351 is mounted in the mechanical amplification member 352, the right end of the mechanical amplification member 352 is connected with the baffle plate 355 and the upper guide plate 33 by an upper guide bolt 331, the left end of the mechanical amplification member 352 is connected with the right end of the dynamic force sensor 353 by a bolt, and the left end of the dynamic force sensor 353 is connected with the upper flexible hinge 37 by transfer.

The lower guide plate 32 is connected with the lower flexible hinge 36 by a lower guide bolt 321, the sleeve 34 is assembled between the lower guide plate 32 and the upper guide plate 33, and the metal spring 31 is sleeved outside the sleeve 34 and is in contact with the lower guide plate 32 and the upper guide plate 33. The upper guide bolt 331 and the lower guide bolt 321 are inserted into a left orifice and a right orifice of the sleeve 34, respectively, and are in sliding fit with the sleeve 34.

An end portion of the lower flexible hinge 36 and an end portion of the upper flexible hinge 37 are connected with the basic platform 10 and the load platform 20 through sunk screws, respectively.

The piezoelectric actuator 351 and the dynamic force sensor 353 are connected with the controller 40 by wires, respectively. The dynamic force sensor detects a vibration signal of the load platform, and inputs the vibration signal to the controller 40. The controller obtains a real-time control signal by calculation, and outputs the real-time control signal to the piezoelectric actuator 351. The mechanical amplification member 352 mechanically amplifies the stroke of the piezoelectric actuator 351, and acts on the load platform 20, to make active control compensations for residual error vibrations of the load platform 20.

The metal spring 31, the lower guide plate 32, the lower guide bolt 321, the upper guide plate 33, the upper guide bolt 331 and the sleeve 34 make up a passive vibration isolation unit.

The piezoelectric actuator 351, the mechanical amplification member 352, the dynamic force sensor 353, the bellow shielding tube 354, the baffle plate 355 and the controller 40 form a closed-loop active vibration isolation unit.

The basic platform 10 may be in a shape of a centrally hollow ring, an equilateral triangle ring or a rectangular ring, so as to be lightweight on the premise of ensuring structural stiffness and strength.

The load platform 20 may be a circular plate or a rectangular plate, so as to ensure the load mounting space.

Figures 7A, 7B:
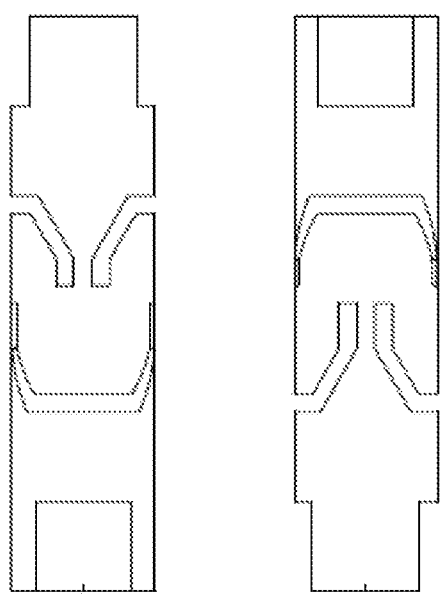
FIG. 7(a) is a top view of a flexible hinge.
FIG. 7(b) is a left view of FIG. 7(a)

As an embodiment, the lower flexible hinge 36 and the upper flexible hinge 37 are of the same structure and both employ a flexible Hooke joint. As shown in FIG. 7(a) and FIG. 7(b), they are double-axis flexible hinges, equivalent to a combination of two revolute pairs whose axes intersect at one point, the members are allowed to have two degrees of freedom of relative rotation, and the intersection point of two axes is the hinge point of the hinges, for avoiding clearance and friction and ensuring high axial stiffness and low rotational stiffness.

In this embodiment, the piezoelectric actuator 351 is a stack-type piezoelectric ceramic actuator. The mechanical amplification member 352 is a triangular amplification member. A triangular amplification actuator with the model of P06.X60AK manufactured by Harbin Core Tomorrow Science & Technology Co., Ltd. is employed, including a mechanical amplification member and a piezoelectric actuator.

As an embodiment, the control method of the present invention includes calculating a logical axis signal, calculating a logical axis control signal, calculating physical axis real-time control signals and a transfer step.

A. a step of calculating a logical axis displacement signal x:

Six dynamic force sensors measure vibration force signals in axial directions of the six sets of single-degree-of-freedom active and passive composite vibration isolation devices, respectively, and the vibration force signals are converted to displacement signals $q_1$, $q_2$, $q_3$, $q_4$, $q_5$, $q_6$, by two integrations and a detrend item, to form a physical axis displacement signal $q=[q_1\ q_2\ q_3\ q_4\ q_5\ q_6]^T$ which is converted, by an operation $\dot{q}=J\cdot\dot{x}$, to the logical axis displacement signal of the centroid point of the load platform as follows:

$$x=[xyz\alpha\beta\gamma]^T$$

wherein J is the velocity Jacobian matrix, and x, y, z, $\alpha$, $\beta$, $\gamma$ are translational displacement signals and rotation angle signals of the centroid point of the load platform along X, Y and Z axes, respectively;

$$J = \begin{bmatrix} l_1^T & l_1^T \tilde{p}_1 \\ l_2^T & l_2^T \tilde{p}_2 \\ l_3^T & l_3^T \tilde{p}_3 \\ l_4^T & l_4^T \tilde{p}_4 \\ l_5^T & l_5^T \tilde{p}_5 \\ l_6^T & l_6^T \tilde{p}_6 \end{bmatrix}$$

wherein $l_1$, $l_2$, $l_3$, $l_4$, $l_5$, $l_6$ are unit direction vectors of the six sets of single-degree-of-freedom active and passive composite vibration isolation devices, respectively, $p_1$, $p_2$, $p_3$, $p_4$, $p_5$, $p_6$ re platform radius vectors formed by hinge connecting points of the upper flexible hinges of the six sets of single-degree-of-freedom active and passive composite vibration isolation devices and the centroid point of the load platform, respectively, $p=[p_1\ p_2\ p_3\ p_4\ p_5\ p_6]$ is a radius matrix formed by the platform radius vectors, and $\tilde{p}=[\tilde{p}_1\ \tilde{p}_2\ \tilde{p}_3\ \tilde{p}_4\ \tilde{p}_5\ \tilde{p}_6]$ is an anti-symmetric matrix of $p=[p_1\ p_2\ p_3\ p_4\ p_5\ p_6]$.

B. a step of calculating a logical axis control signal:

a logical axis control signal $x'=[x'\ y'\ z'\ \alpha'\ \beta'\ \gamma']^T$ is obtained by calculation with an active control algorithm according to the logical axis displacement signal x, wherein x', y', z', $\alpha'$, β', γ' are translational displacement signals and rotation angle signals of the centroid point, after a calculation process, along X, Y and Z axes, respectively.

In the step of calculating a logical axis control signal, the active control algorithm is a proportional integral (PI) force feedback control algorithm, a recursive least square (RLS) adaptive algorithm or a least mean square (LMS) adaptive control algorithm.

The proportional integral (PI) force feedback control algorithm is derived from Classical Control Theory, Proportional-Integral-Differential (PID) Controller; see the book *Parameter Setting and Implementation of the PID Controller*, written by Huang Yourui, Qu Liguo, Beijing: Science Press, 2010.

The recursive least square (RLS) adaptive algorithm and the least mean square (LMS) adaptive control algorithm are both derived from the book *Adaptive Filtering Algorithm and Implementation*, Written by Paulo S. R. Diniz, Beijing: Publishing House of Electronics Industry, 2014; and *Adaptive Signal Processing Technology*, written by Zhao Chunhui, Zhang Chaozhu, et al., Beijing: Beijing Institute of Technology Press, 2009.

C. a step of calculating physical axis real-time control signals:

by transposing the velocity Jacobian matrix $J^T$, the logical axis control signal x' is converted to a physical axis control signal $q'=[q'_1\ q'_2\ q'_3\ q'_4\ q'_5\ q'_6]^T$, $\dot{q}=J^T \cdot \dot{x}'$, wherein $q'_1, q'_2, q'_3, q'_4, q'_5, q'_6$ are respectively control signals of the six sets of single-degree-of-freedom active and passive composite vibration isolation devices after the conversion; wherein the expression of transposing the Jacobian matrix $J^T$ is as follows:

$$J^T = \begin{bmatrix} l_1^T & l_2^T & l_3^T & l_4^T & l_5^T & l_6^T \\ l_1^T \tilde{p}_1 & l_2^T \tilde{p}_2 & l_3^T \tilde{p}_3 & l_4^T \tilde{p}_4 & l_5^T \tilde{p}_5 & l_6^T \tilde{p}_6 \end{bmatrix}$$

D. a transfer step:

the control signals of the six sets of single-degree-of-freedom active and passive composite vibration isolation devices are transferred to the corresponding piezoelectric actuators, respectively, to drive the mechanical amplification mechanism to make real-time active vibration control over the corresponding single-degree-of-freedom active and passive composite vibration isolation devices.

In the step of calculating a logical axis control signal, a calculation process is performed on the logical axis displacement signal x=[x,y,z] by a proportional integral (PI) force feedback control algorithm to obtain a logical axis control signal $x'=[x'y'z'\alpha'\beta'\gamma']^T$, wherein x', y', z', α', β', γ' are translational displacement signals and rotation angle signals of the centroid point, after a calculation process, along X, Y and Z axes, respectively.

The proportional integral (PI) force feedback control algorithm is:

$x'=x \cdot u(t)$, $u(t)=k_p+k_i\int e(t)dt$, in the formula, u(t) is a time-domain output signal of a proportional integral (PI) control algorithm, $k_p$ is a proportional gain coefficient, $k_i$ is an integral gain coefficient, e(t) is an error of x' and x, and t is a time coefficient.

Figure 8A:
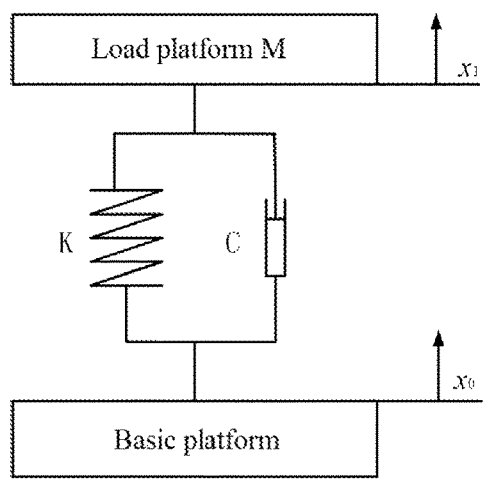
FIG. 8(a) is a schematic diagram of the principle of the traditional passive vibration isolation mechanism.

Vibration isolation principles of the passive vibration isolation mechanism in the present invention and in the prior art are compared in the following:

As shown in FIG. 8(a), the passive vibration isolation mechanism in the prior art is formed by the traditional spring-mass-damping units, to achieve simple passive vibration isolation, and the transmissibility curve function G thereof is:

$$G = \frac{x_1}{x_0} = \frac{Cs + K}{Ms^2 + Cs + K};$$

in the formula, $x_1$ is the vibration displacement amount of the load platform, $x_0$ is the vibration displacement amount of the basic platform, C is the equivalent damping of the mechanism, K is the equivalent stiffness between the load platform and the basic platform, M is the mass of the load platform, s=jω is a complex variable of Laplace transform, and ω is a frequency domain coefficient.

Figure 8B:
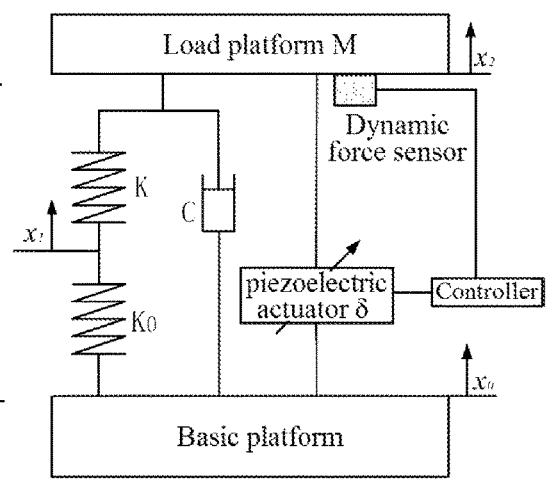
FIG. 8(b) is a schematic diagram of the principle of a vibration isolation mechanism of the present invention.

As shown in FIG. 8(b), on the basis of the passive vibration isolation mechanism in the prior art, in the present invention, a passive elastic element (a metal spring is employed in the embodiment) of which the stiffness is easy to change is added in series, and an active feedback control loop is added. The active feedback control loop runs in a mode that the sensor feeds back, the controller calculates and the actuator outputs, to form an active and passive composite vibration isolation mechanism, and the transmissibility curve function $G_o$ thereof in the situation of an open loop is:

$$G_o = \frac{x_2}{x_0} = \frac{(K_0C + KC)s + K_0K}{(MK + MK_0)s^2 + (K_0C + KC)s + K_0K};$$

in the formula, $x_2$ is the vibration displacement mount of the load platform when the active and passive composite vibration isolation mechanism is employed, $K_0$ is the stiffness of the spring added in series, K is the equivalent stiffness of the original system, C is the equivalent damping of the original system, and M is the mass of the load platform. The passive vibration isolation unit is actively controlled (a PI force feedback control algorithm is employed in this embodiment) with the vibration signal on the load platform as a reference, to form an active and passive composite vibration isolation unit, wherein the control force F is:

$$F = Mx_2s^2 \cdot \left(k_p + k_i\frac{1}{s}\right);$$

wherein a time domain formula of the proportional integral (PI) control algorithm is:

$u(t)=k_p+k_i\int e(t)dt$, a frequency domain formula of the proportional integral (PI) control algorithm is:

$G=k_p+k_i 1/s$, in the above formulas, $k_p$ is a proportional gain coefficient, $k_i$ is an integral gain coefficient, e(t) is an error between the logical axis control signal and the logical axis displacement signal, t is a time coefficient, s=jω is a complex variable of Laplace transform, and ω is a frequency domain coefficient.

The transmissibility curve function $G_c$ of the active and passive composite vibration isolation mechanism in the situation of a closed loop is:

$$G_c = \frac{x_2}{x_0} = \frac{(K_0 C + KC)s + K_0 K}{M(1+k_p)(K+K_0)s^2 + (K_0+K)(C+k_i M)s + K_0 K};$$

Figure 9:
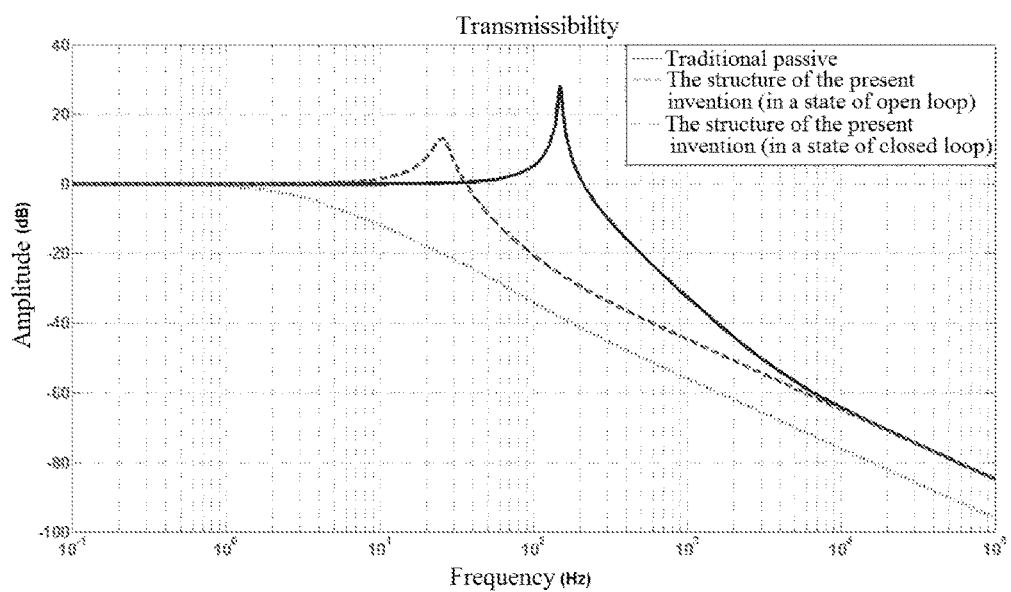
FIG. 9 is a comparative diagram of a curve of the traditional passive vibration isolation unit in FIG. 1 vs. transmissibility of the present invention in situations of an open loop and a closed loop.

FIG. 9 is a curve of the existing passive vibration isolation mechanism in FIG. 8 vs. transmissibility of the present invention in situations of a closed loop and an open loop. It can be seen from the solid lines in the figure that, when the existing passive vibration isolation mechanism is employed, the passive transmissibility thereof has a higher peak value at the low frequency formant, and the natural frequency of the system is higher. It can be seen from the dashed line in the figure that, after the structure of the present invention is employed, as an additional stiffness spring is connected in series, the stiffness of the system is further reduced, and the damping is also further enhanced. It can be seen from the dotted line in the figure that, on the basis of the structure of the present invention in coordination with an active control method such as PI force feedback, the stiffness of the system changes continuously, the natural frequency further moves forward, and the formant of the system is also compensated by the skyhook damping actively controlled at the same time. It can be seen from the curve of transmissibility of the system that the present invention causes the vibration suppression capability to be further enhanced in performance.

In the present invention, the single-degree-of-freedom active and passive composite vibration isolation device is composed of active and passive vibration isolation units, and the metal spring, the lower guide plate, the lower guide bolt, the upper guide plate, the upper guide bolt and the sleeve make up the passive vibration isolation unit; the piezoelectric actuator, the mechanical amplification member, the dynamic force sensor, the bellow shielding tube, the baffle plate and the controller form a closed-loop active vibration isolation unit.

In the passive vibration isolation unit, the metal spring having different stiffness and made of different materials can be replaced according to actual requirements to achieve the property of variable stiffness, so as to change the effective bandwidth of the system and adapt to different micro vibration environments. The upper and lower guide plates serve as a guide mechanism to ensure the axial motion precision of the metal spring, and the sleeve, as a stroke protection mechanism avoids that the passive vibration isolation unit is plastically deformed during motion and transportation.

In the active vibration isolation unit, the dynamic force sensor has the characteristic of higher SNR relative to the acceleration sensor, for detecting a dynamic real-time vibration signal of the load platform and inputting the measured vibration signal to the controller. In the controller, a physical axis real-time control signal is calculated by an active control algorithm and is output to the piezoelectric actuator. The piezoelectric actuator, as an output mechanism of active real-time control, has characteristics such as low power consumption, high positioning precision and rapid frequency response, which not only can effectively suppress and isolate micro vibrations, but also expands and extends, with its low power consumption, application environments (e.g., precise vibration reduction of space remote sensing satellites) in which energy consumption is relatively limited. The mechanical amplification member mechanically amplifies the stroke of the piezoelectric actuator, to widen its effective working stroke, and makes the piezoelectric actuator act on the load platform, to make active control compensations for residual error vibrations of the load platform, thus reducing vibrations of the load platform and achieving the effect of vibration suppression.

In the active control algorithm of the present invention, the proportional integral (PI) force feedback control algorithm is simple and mature and has a small calculation amount, the feedback control structure is simple and easy to implement, and an effect of skyhook damping is achieved, thus effectively attenuating the formant at the natural frequency.

The present invention has a simple structure, is adjustable in stiffness, and may reduce dynamic stiffness of the system by using series connection of system stiffness, thus reducing the natural frequency of the system. The present invention can change the system stiffness and damping characteristics by using the active vibration isolation unit, thus changing the property of transmissibility of the system, and can suppress and isolate six-degree-of-freedom micro vibrations in translational directions and rotational directions of X, Y and Z axes, which not only better attenuates high-frequency signals but also, in the control method, can increase the skyhook damping of formant frequency points and can effectively suppress low-frequency resonance and isolate low-frequency vibrations. The present invention can adapt to different occasions, and can effectively attenuate micro vibrations at different frequency bands, to provide reliable guarantee for precise machining and measurement devices in micro vibration environments.

It will be easily understood by those skilled in the art that the above descriptions are merely preferred embodiments of the present invention but are not used to limit the present invention, and any modification, equivalent replacement, improvement and the like made within the spirit and principle of the present invention should be included in the protection scope of the present invention.

The invention claimed is:

1. A six-degree-of-freedom micro vibration suppression platform, comprising:
a basic platform, a load platform, six sets of single-degree-of-freedom active and passive composite vibration isolation devices that are exactly the same and a controller;
axes of the six sets of single-degree-of-freedom active and passive composite vibration isolation devices forming six sides remaining after the sides connected by two diagonal vertices of a cube are removed, intersection points of the axes being six vertices of the cube, three upper intersection points being fixed onto the load platform and being evenly distributed on the load platform along the circumference at an interval of 120°; three lower intersection points being fixed onto the basic platform and being evenly distributed on the basic platform along the circumference at an interval of 120°; axes of any two adjacent single-degree-of-freedom active and passive composite vibration isolation devices being perpendicular to each other, and the same end being disposed toward the intersection point of the axes;
the single-degree-of-freedom active and passive composite vibration isolation devices each comprising an upper flexible hinge, an active vibration isolation assembly, a passive vibration isolation assembly and a lower flexible hinge that are sequentially connected and fixed; and the controller being connected with the active vibration isolation assemblies of the six sets of single-degree-of-freedom active and passive composite vibration isolation devices, for obtaining a real-time control signal by calculation and outputting the real-time control signal to the active vibration isolation assemblies, to make active control compensations for vibrations, and wherein the active vibration isolation assembly comprises a piezoelectric actuator, a mechanical amplification member, a dynamic force sensor, a bellow shielding tube and a baffle plate; and the passive vibration isolation assembly comprises a metal spring, an upper guide plate, a lower guide plate, a sleeve and a screw;

wherein the piezoelectric actuator, the mechanical amplification member and the dynamic force sensor are disposed in the interior of the bellow shielding tube, and at a lower end of the bellow shielding tube is the baffle plate; the dynamic force sensor is fixed to an upper end of the bellow shielding tube, an upper end of the mechanical amplification member is fixed to a lower end of the dynamic force sensor, and a lower end of the mechanical amplification member is stopped at an inner side of the baffle plate and is fixed to an upper end of the screw; the piezoelectric actuator is fixed to the interior of the mechanical amplification member, and the mechanical amplification member is used for amplifying the motion stroke of the piezoelectric actuator; the bellow shielding tube is axially telescopic; and the upper flexible hinge is mounted to the upper end of the bellow shielding tube;

the upper end of the screw is an upper guide bolt, and the lower end thereof is a lower guide bolt the upper guide bolt passes through the baffle plate to enter the interior of the bellow shielding tube, and is connected and fixed to the lower end of the mechanical amplification member; the upper guide plate is stopped at a lower side of the baffle plate, and is fixed by the upper guide bolt an end portion of the lower guide bolt is fixed to an upper end of the lower flexible hinge, and the lower guide plate is stopped at the upper end of the lower flexible hinge and is fixed by the lower guide bolt the metal spring is sleeved on the screw and is stopped between the upper guide plate and the lower guide plate, and the sleeve is sleeved between the screw and the metal spring; and the piezoelectric actuator and the dynamic force sensor are connected with the controller, respectively, and the dynamic force sensor is used for detecting a vibration signal of the load platform and inputting the vibration signal to the controller; the controller is used for calculating a real-time control signal according to the obtained vibration signal and outputting the real-time control signal to the piezoelectric actuator, to deform the piezoelectric actuator; the mechanical amplification member is used for mechanically amplifying the stroke of the piezoelectric actuator, and acting on the load platform by transfer of the bellow shielding tube and the upper flexible hinge, to make active control compensations for residual error vibrations of the load platform.

2. The six-degree-of-freedom micro vibration suppression platform according to claim 1, wherein the lower flexible hinge and the upper flexible hinge are of the same structure and both employ a flexible Hooke joint.

3. The six-degree-of-freedom micro vibration suppression platform according to claim 1, wherein the piezoelectric actuator is a stack-type or tube-type piezoelectric ceramic actuator; the mechanical amplification member is a triangular amplification member or a micro motion worktable amplification member.

4. A control method of a six-degree-of-freedom micro vibration suppression platform, wherein the six-degree-of-freedom micro vibration suppression platform comprises:

a basic platform, a load platform, six sets of single-degree-of-freedom active and passive composite vibration isolation devices that are exactly the same and a controller;

axes of the six sets of single-degree-of-freedom active and passive composite vibration isolation devices forming six sides remaining after the sides connected by two diagonal vertices of a cube are removed, intersection points of the axes being six vertices of the cube, three upper intersection points being fixed onto the load platform and being evenly distributed on the load platform along the circumference at an interval of 120°; three lower intersection points being fixed onto the basic platform and being evenly distributed on the basic platform along the circumference at an interval of 120°; axes of any two adjacent single-degree-of-freedom active and passive composite vibration isolation devices being perpendicular to each other, and the same end being disposed toward the intersection point of the axes;

the single-degree-of-freedom active and passive composite vibration isolation devices each comprising an upper flexible hinge, an active vibration isolation assembly, a passive vibration isolation assembly and a lower flexible hinge that are sequentially connected and fixed; and the controller being connected with the active vibration isolation assemblies of the six sets of single-degree-of-freedom active and passive composite vibration isolation devices, for obtaining a real-time control signal by calculation and outputting the real-time control signal to the active vibration isolation assemblies, to make active control compensations for vibrations, the method comprising:

A. calculating a logical axis displacement signal x of the centroid point of the load platform the six active vibration isolation assemblies measuring vibration force signals in axial directions of the six sets of single-degree-of-freedom active and passive composite vibration isolation devices respectively and delivering up the vibration force signals to the controller, the controller converting the vibration force signals to displacement signals $q_1, q_2, q_3, q_4, q_5, q_6$ by two integrations and a detrend item, to form a physical axis displacement signal $q=[q_1\ q_2\ q_3\ q_4\ q_5\ q_6]^T$ which is converted, by an operation $\dot{q}=J\cdot\dot{x}$, to the logical axis displacement signal of the centroid point of the load platform as follows:

$$x=[xyz\alpha\beta\gamma]^T$$

wherein J is the velocity Jacobian matrix, and x, y, z, $\alpha$, $\beta$, $\gamma$ are translational displacement signals and rotation angle signals of the centroid point of the load platform along X, Y and Z axes, respectively;

$$J = \begin{bmatrix} l_1^T & l_1^T \tilde{p}_1 \\ l_2^T & l_2^T \tilde{p}_2 \\ l_3^T & l_3^T \tilde{p}_3 \\ l_4^T & l_4^T \tilde{p}_4 \\ l_5^T & l_5^T \tilde{p}_5 \\ l_6^T & l_6^T \tilde{p}_6 \end{bmatrix}$$

wherein $l_1, l_2, l_3, l_4, l_5, l_6$ are unit direction vectors of the six sets of single-degree-of-freedom active and passive composite vibration isolation devices, respectively, $p_1, p_2, p_3, p_4, p_5, p_6$ are platform radius vectors formed by hinge connecting points of the upper flexible hinges of the six sets of single-degree-of-freedom active and passive composite vibration isolation devices and the centroid point of the load platform, respectively, $p=[p_1\ p_2\ p_3\ p_4\ p_5\ p_6]$ is a radius matrix formed by the platform radius vectors, and $\tilde{p}=[\tilde{p}_1\ \tilde{p}_2\ \tilde{p}_3\ \tilde{p}_4\ \tilde{p}_5\ \tilde{p}_6]$ is an anti-symmetric matrix of $p=[p_1\ p_2\ p_3\ p_4\ p_5\ p_6]$;

B. calculating a logical axis control signal x' of the centroid point of the load platform obtaining a logical axis control signal $x'=[x'\ y'\ z'\ \alpha'\ \beta'\ \gamma']^T$ by calculation with an active control algorithm according to the logical axis displacement signal x, wherein x', y', z', $\alpha'$, $\beta'$, $\gamma'$ are translational displacement signals and rotation angle signals of the centroid point, after a calculation process, along X, Y and Z axes, respectively;

C. calculating physical axis real-time control signals of the six sets of single-degree-of-freedom active and passive composite vibration isolation devices:

by transposing the velocity Jacobian matrix $J^T$, converting the logical axis control signal x' to a physical axis control signal $q'=[q'_1\ q'_2\ q'_3\ q'_4\ q'_5\ q'_6]^T$, $\dot{q}=J^T \cdot \dot{x}'$, wherein $q'_1, q'_2, q'_3, q'_4, q'_5, q'_6$ are respectively control signals of the six sets of single-degree-of-freedom active and passive composite vibration isolation devices after the conversion; wherein the expression of transposing the Jacobian matrix $J^T$ is as follows:

$$J^T = \begin{bmatrix} l_1^T & l_2^T & l_3^T & l_4^T & l_5^T & l_6^T \\ l_1^T \tilde{p}_1 & l_2^T \tilde{p}_2 & l_3^T \tilde{p}_3 & l_4^T \tilde{p}_4 & l_5^T \tilde{p}_5 & l_6^T \tilde{p}_6 \end{bmatrix}$$

D. a transfer step:

the controller transferring the physical axis real-time control signals of the six sets of single-degree-of-freedom active and passive composite vibration isolation devices to the corresponding active vibration isolation assemblies, respectively, to make real-time active vibration compensations for the corresponding single-degree-of-freedom active and passive composite vibration isolation devices.

5. The control method according to claim 4, wherein the active vibration isolation assemblies each comprise a piezoelectric actuator, a mechanical amplification member and a dynamic force sensor, and in step A, the six dynamic force sensors measure vibration force signals in axial directions of the six sets of single-degree-of-freedom active and passive composite vibration isolation devices, respectively; in step D, the controller transfer the physical axis real-time control signals of the six sets of single-degree-of-freedom active and passive composite vibration isolation devices to the corresponding piezoelectric actuators, respectively; the mechanical amplification members amplify the motion strokes of the piezoelectric actuators to make vibration compensations, thereby achieving active vibration compensations.

* * * * *